UNITED STATES PATENT OFFICE.

WILLIAM ALBERT RUDDELL, OF ASBURY PARK, NEW JERSEY.

LIQUID COATING COMPOSITION.

1,292,964.  Specification of Letters Patent.  Patented Jan. 28, 1919.

No Drawing.  Application filed January 16, 1918.  Serial No. 212,015.

*To all whom it may concern:*

Be it known that I, WILLIAM A. RUDDELL, a citizen of the United States, residing at Asbury Park, in the county of Monmouth and State of New Jersey, have invented certain new and useful Improvements in Liquid Coating Compositions, of which the following is a specification.

This invention has as its object the provision of a liquid coating composition or paint which may be readily and conveniently applied by a brush or otherwise to water pipes, steam pipes, radiators, tanks, boilers and in fact any conducting pipe or storage tank, reservoir, or the like so located as to render likely the freezing of the water or other liquid contents thereof in cold weather, the purpose of the composition being to effectually prevent such freezing even at extremely low degrees of temperature.

In preparing the coating composition embodying the present invention I make use of paraffin wax, petrolatum and alcohol and thoroughly mixing these ingredients in about the proportions of paraffin wax forty per cent. petrolatum forty per cent. and alcohol twenty per cent. until the mixture is of uniform consistency throughout. If desired, I may reduce the quantity of alcohol employed and increase the quantity of petrolatum and paraffin. Also I may employ either ethyl alcohol or methyl alcohol. At the time of mixing the ingredients they are placed in a suitable vessel and heated to such degree of temperature as will permit of them being readily stirred and thus thoroughly mixed, after which the mixture may be poured into suitable containers and permitted to stand until cool. Before applying the mixture it is again heated and is applied in its heated condition in one or several coats as desired, by a brush or otherwise, to the outer surfaces of the pipes, tanks, radiators, or the like to be protected, and is permitted to dry thereon.

Not only will the composition effectually prevent freezing of water within pipes or tanks to which it is applied, but it will also serve effectually to prevent the "sweating" of the pipes or tanks which frequently occurs in damp weather and in various ways causes annoyance.

While it is preferable that the ingredients be employed in the proportions herein stated, it will be understood that these proportions may be somewhat varied if desired.

Having thus described the invention, what is claimed as new is.

1. A liquid coating composition for the purpose stated consisting of a mixture of paraffin, petrolatum and alcohol in about the relative proportions stated.

2. A liquid coating composition for the purpose stated consisting of a mixture of paraffin forty per cent., petrolatum forty per cent., and alcohol twenty per cent.

In testimony whereof I affix my signature.

WILLIAM ALBERT RUDDELL. [L. S.]